United States Patent Office
2,937,804
Patented May 24, 1960

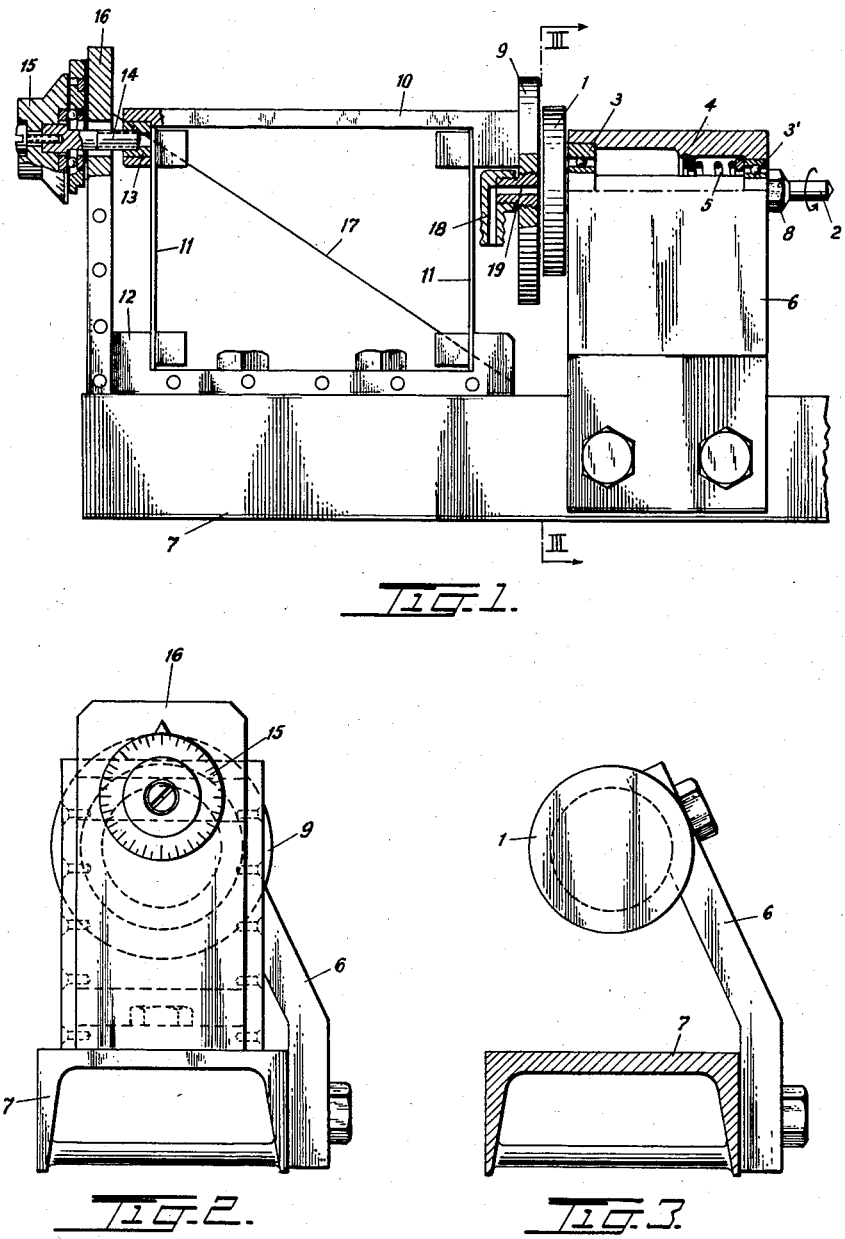

2,937,804
APPARATUS FOR THE COMPRESSION OF GASES

Markus Reiner, 21 Kiriat Sefer, Ahuza, Haifa, Israel, and Jakhin Boas Popper, Spilberg House, Kfar Atta, Haifa, Israel Filed June 24, 1957, Ser. No. 667,618

Claims priority, application Israel June 29, 1956

5 Claims. (Cl. 230—124)

The invention provides new apparatus for the compression of gases, in particular air, for a variety of different applications.

In principle, the apparatus according to the invention comprises a rotor and a stator facing each other with substantially parallel surfaces across a narrow gap. It would normally be expected that where a rotor thus faces a stator, the rotation of the rotor would produce a centrifugal motion of the air in the gap. This phenomenon is utilized in conventional centrifugal pumps and compressors.

The invention is based on the new observation that if the gap between the rotor and stator is reduced to very small dimensions and/or the speed of rotation of the rotor is considerably increased, the movement of the gas becomes centripetal instead of centrifugal and compression of the gas occurs towards the axis of the rotor.

Accordingly, the invention consists in an apparatus for the compression of gases with self-generated centripetal gas motion, comprising a rotor with circular circumference rotatable with high speed, and a stator facing the rotor across a very narrow gap open at the circumference of the rotor, the surfaces of the rotor and stator that face each other being substantially parallel.

The speed of the rotor and the width of the gap are to a certain extent interdependent. The velocity gradient, i.e. the fraction $V/D$, wherein $V$ denotes the circumferential velocity of the rotor relative to the stator, and $D$ the width of the gap, should for the purpose of this invention not be smaller than $10^6$ sec.$^{-1}$. Moreover, the gap should in any case, i.e. irrespective of the circumferential velocity, be smaller than 0.5 mm. If in the velocity gradient $V/D$ the velocity $V$ is expressed in cm. sec.$^{-1}$ and the width $D$ in cm., the dimension of the gradient is sec.$^{-1}$. The result will be the same if the length in both $V$ and $D$ is expressed in any other measure, e.g. in inches. For the gradient to be as large as $10^6$ sec.$^{-1}$, the velocity $V$ must be very high and/or the width $D$ of the gap very small.

The term "stator" is used in connection with this invention in order to denote not only a stationary body, as usual, but it includes also a rotatable body which may turn in the same direction as the rotor, or in the opposite direction. In any case, for the purpose of determining the velocity gradient, the circumferential speed $V$ of the rotor is the relative speed between the rotor and the stator.

The rotor and the stator may have various shapes according to the application of the apparatus, but they will have to be defined by a surface of revolution of any description. For example, they may be flat discs, hemispheres, cones, conical frustums, ellipsoids, or the like.

Of the various applications to which the apparatus according to the present invention can be put, the following are noteworthy:

(a) As a compressor, in which case the center of the stator and/or the rotor will be provided with an outlet for the compressed gas;

(b) As a vacuum pump, in which case the apparatus will be enclosed in a casing adapted to be connected to the vessel to be evacuated, and an outlet for the pumped gas will be provided in the center of the stator and/or rotor;

(c) As an air-bearing;

(d) As a seal for the joint between a fixed part of a gas conduit and a part of the conduit rotating about its axis.

The invention is illustrated, by way of example only, in the accompanying drawings in which:

Fig. 1 is a side elevation, partly in axial section, of an apparatus according to the invention designed as an air-compressor;

Fig. 2 is an elevation thereof from the left-hand side of Fig. 1;

Fig. 3 is a cross-section thereof on line III—III of Fig. 1;

Figure 4:
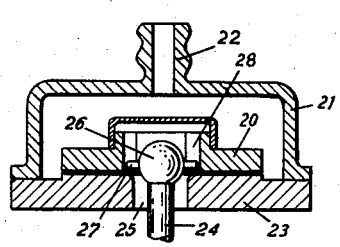
Fig. 4 is a fragmentary axial section of a similar apparatus designed as a vacuum pump.

The air-compressor illustrated in Figs. 1–3 comprises a rotor 1, being a flat circular disc, mounted on a shaft 2 journalled in two bearings 3, 3' disposed in a housing 4 in which the rear bearing 3' is axially displaceable. The housing 4 is supported by a bracket 6 fixed to the frame 7 of the apparatus. The shaft 2 is prevented from axial displacement relative to the bearing 3' by a collar 8 or equivalent means, and a compression spring 5 interposed in the space between the two bearings urges the bearing 3' rearwards and diminishes the clearance between the balls and ball races of both bearings.

The shaft 2 is connected to a suitable drive, e.g. an electric motor (not illustrated) imparting to it the desired speed. In an experimental apparatus in which the rotor had a diameter of 50 mm., the speed of rotation was approximately 10,000 r.p.m.

The stator 9 is a stationary circular disc 8 parallel and co-axial with the rotor 1, and spaced from the latter by a gap of variable width. Its diameter may be different from that of the rotor, e.g. larger as shown in this example. The stator is secured to a carrier rail 10 fixed to the upper ends of two leaf springs 11 whose foot ends are fixed to a bracket 12 of the machine frame 7. The end of the carrier rail 10 opposite to the stator comprises a tapped socket 13 in which engages the shank 14 of a micrometer screw 15. The latter is mounted in a shield 16 secured to the apparatus frame. Vibrations of this shield are prevented by lateral gusset plates 17. Operation of the screw 15 narrows or widens the gap. During these adjustments the stator is not tilted relative to the rotor owing to the flexibility of the springs 11.

A tubular connection 18 extends from the center of the stator where an aperture 19 is provided. This connection 18 may be connected, e.g. by a flexible hose, to the receptacle where compressed air is to be collected.

The aforesaid experimental apparatus produced an air pressure of upwards of 0.5 atmosphere. This compared very favourably with conventional centrifugal air compressors of similar dimensions and speed of the rotor, by which a pressure of about 0.03 atmosphere only could be obtained under the most favourable circumstances. The superiority of an air compressor according to the invention over a conventional centrifugal air compressor is thus obvious.

The embodiment of the invention according to Fig. 4 exemplifies the application of the invention to vacuum pumps. The rotor 20 is enclosed in a casing 21, which has a suction connection 22 in its top wall while its bottom is constituted by the stator 23. The shaft 24 of the rotor passes freely through a central opening 25 of the stator through which the aspirated air escapes into the atmosphere. The upper end of the shaft merges into a ball 26 from which two pins 27 project in opposite directions normal to the axis of the shaft. These pins engage with some clearance in slots 28 of the rotor, whereby the rotor is coupled to the shaft and made to rotate with it. At the same time the rotor is free to turn about the ball about any axis of rotation perpendicular to the axis of shaft 24. This enables the gap to become self-adjusting with regard to both parallelity and width. The air cushion in the gap exerts an axial thrust on the rotor and stator and the rotor is balanced without making contact with the stator.

Figure 5:
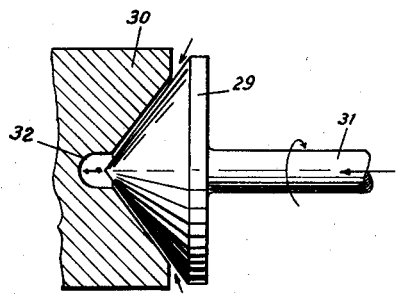
Figs. 5 and 6 are fragmentary elevations, partly in axial section, of two different air-bearings according to the invention.

The embodiment of the invention illustrated in Fig. 5 is an air bearing. It comprises a conical rotor 29 and a stator 30 whose conical recess matches the shape of the rotor. The rotor 29 is disposed at one end of a shaft 31, and a similar rotor may be disposed at the opposite (not illustrated) end of the shaft. The stator is the fixed part of the bearing in which the shaft is journalled. The bearing material proper in which the rotor 29 runs, is a cushion of air formed in the gap between the rotor and stator. The stator has an about hemispherical depression 32 facing the point of the rotor, where compressed air collects.

Figure 6:
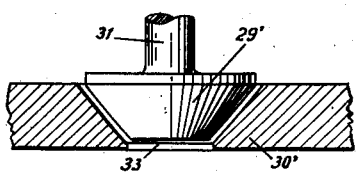

The air bearing illustrated in Fig. 6 differs from that according to Fig. 5 in that the depression 32 is replaced by an outlet 33 and the rotor 29' and the corresponding surface in the stator 30' are frusto-conical instead of conical. In this case the centripetal pumping effect continuously renews the air in the gap whereby the bearing is cooled.

The bearing according to Fig. 5 has been shown to serve for a horizontal shaft, and that according to Fig. 6 for a vertical shaft, but the uses of both bearings are interchangeable.

In connection with the bearings according to Figs. 5 and 6, auxiliary means, e.g. an auxiliary bearing, may be provided in order to support the shaft at rest and at low speeds of rotation when the centripetal air-aspirating effect is absent. The auxiliary supporting means may be so designed as to become disengaged automatically when the shaft reaches full operational speed, and automatically to become re-engaged when the shaft slows down. However, these auxiliary means may also be omitted as the thin gas film, always existing between the rotor and stator, may suffice to start the operation without any noticeable damage to the surfaces.

Air-bearings are known in principle, but for producing the air cushion, it has hitherto been deemed to be necessary to provide either an extraneous source of compressed air, e.g. a compressor, or wedge-forming surfaces defining the gap. This is no longer required in an air-bearing according to the invention.

Figure 7:
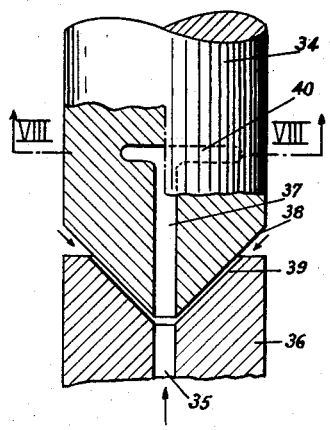
Fig. 7 is a fragmentary elevation, partly in axial section, of a joint seal according to the invention.
Figure 8:
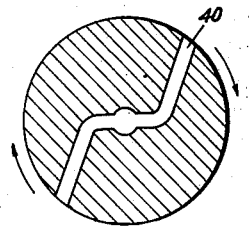
Fig. 8 is a cross-section on line VIII—VIII of Fig. 7.

Figs. 7 and 8 illustrate a gyroscope 34 whose rotation is produced by pressurized gas or steam. The pressurized fluid is supplied through a conduit 35 provided in a stationary block 36 and opening into an axial conduit 37 of the gyroscope which branches out into lateral ducts 40 disposed in positions other than radial and opening at the circumference of the body 34. As the pressure fluid streams leave the body 34 through the ducts 38, the body 34 is rotated by reaction.

Hitherto it has not been possible to tighten the joint between the stationary conduit and the gyroscope body. For this reason, gyroscopes have hitherto been operated by gas pressure developed in their interior without the continual supply of pressurized fluid.

The invention solves the problem of tightening the joint as the centripetal action of the device draws air from the vicinity into the joint, or at least prevents the pressure medium from leaking out through the joint.

In analogy to the shape of the rotor in the embodiment according to Fig. 5, the gyroscope 34 has a conical end surface 38 and constitutes the rotor. This faces across the narrow gap a correspondingly shaped conical recess 39 formed in the end of the conduit body 36 which substitutes the stator.

We claim:

1. An apparatus for centripetally impelling gases comprising a rotor and a stator having opposed spaced parallel smooth surfaces of relative revolution, said rotor being mounted on a shaft for rotation therewith, said space being a gap not exceeding 0.5 mm. and providing a gas intake at the outer periphery of said rotor, said parallel surfaces extending radially inwardly toward the axis of said shaft, said stator surface having a central axially extending discharge opening, said rotor adapted to rotate at a speed to produce a velocity gradient not smaller than $10^6$ sec.$^{-1}$, whereby a centripetal gas motion is produced by said rotor in said gap and said gas is discharged from said axially extending opening.

2. An apparatus for centripetally impelling gas as defined in claim 1, wherein the stator has a closed chamber communicating with the central axially extending discharge opening, whereby said chamber forms a compression bearing chamber for supporting the rotor.

3. An apparatus for centripetally impelling gases as defined in claim 1, wherein the rotor and stator have complemental conical surfaces.

4. An apparatus for centripetally impelling gases as defined in claim 1, wherein the rotor and stator have complemental frustoconical surfaces.

5. An apparatus for centripetally impelling gases as defined in claim 1, wherein the rotor and stator have flat planar complemental surfaces.

References Cited in the file of this patent

UNITED STATES PATENTS

| | | |
|---|---|---|
| 1,898,659 | Gardner | Feb. 21, 1933 |
| 1,914,498 | Gardner | June 20, 1933 |
| 1,942,139 | Dubrovin | Jan. 2, 1934 |
| 1,961,451 | Phillips et al. | June 5, 1934 |
| 2,695,198 | Brugger | Nov. 23, 1954 |
| 2,695,199 | Blizard | Nov. 23, 1954 |
| 2,824,521 | Birkigt | Feb. 25, 1958 |

FOREIGN PATENTS

| | | |
|---|---|---|
| 130,157 | Great Britain | July 19, 1925 |
| 332,879 | Great Britain | July 1, 1930 |
| 439,542 | France | Apr. 6, 1912 |
| 568,724 | Great Britain | Apr. 18, 1945 |
| 880,979 | Germany | June 25, 1953 |